March 25, 1969 R. F. WILEY 3,434,821
APPARATUS FOR PRESSING ARTICLES OF THERMOPLASTIC MATERIAL
Filed Feb. 15, 1965
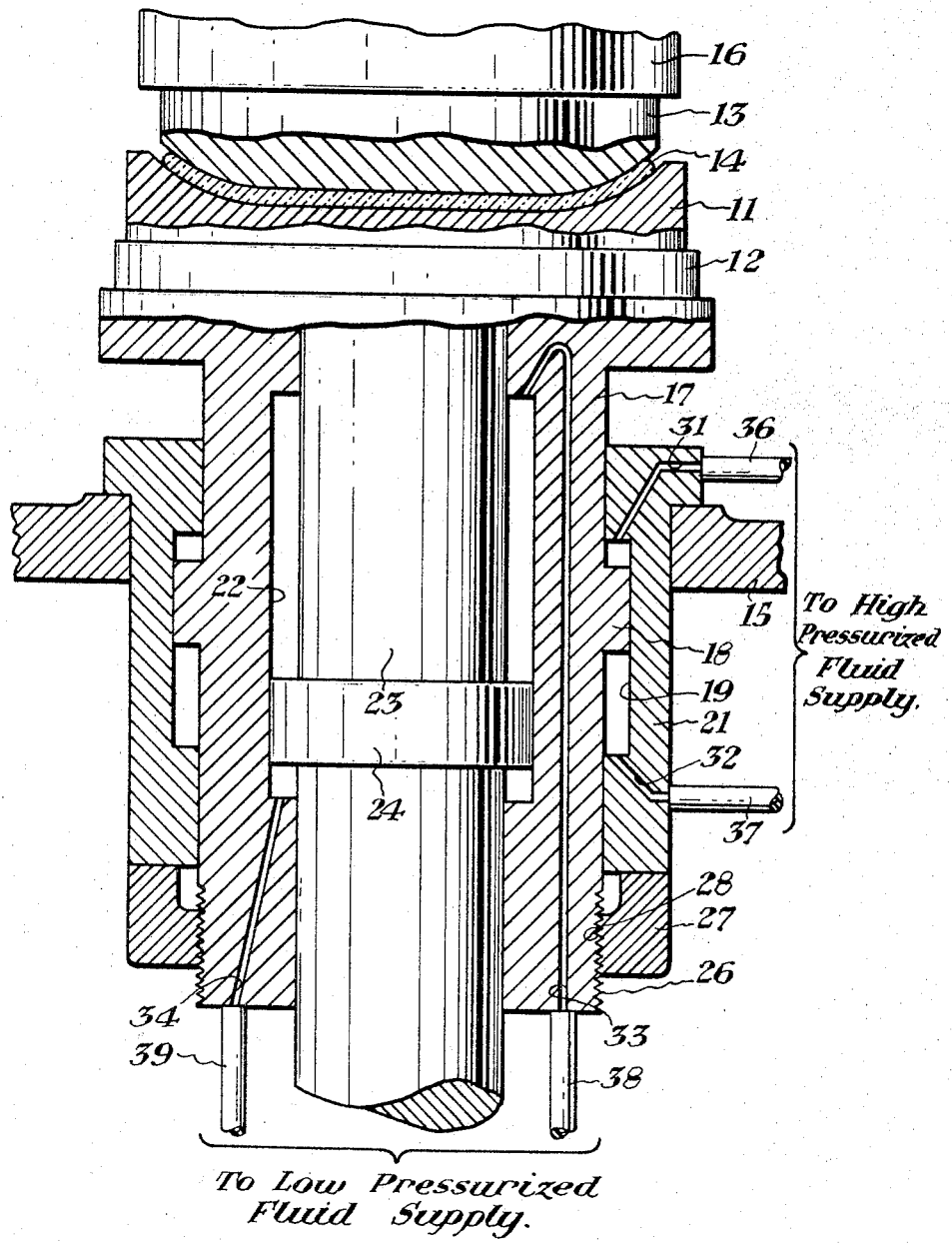
INVENTOR.
Robert F. Wiley.
BY Charles W. Gregg
AGENT.

United States Patent Office 3,434,821
Patented Mar. 25, 1969

3,434,821
APPARATUS FOR PRESSING ARTICLES OF THERMOPLASTIC MATERIAL
Robert F. Wiley, Corning, N.Y., assignor to Corning Glass Works, Corning, N.Y., a corporation of New York
Filed Feb. 15, 1965, Ser. No. 432,546
Int. Cl. C03b 11/12, 11/06
U.S. Cl. 65—320                                        9 Claims

ABSTRACT OF THE DISCLOSURE

Apparatus for and method of free pressing articles of molten thermoplastic materials such as molten glass, such apparatus comprising a press including cooperative male and female mating mold members whose degree of mating relationship may be varied by manually adjustable means and further including means for maintaining the forming surfaces of said members in contact with the formed surfaces of a pressed article, following the forming thereof, to aid in cooling of such article and, during such cooling, maintaining the contour imparted to the article during the press forming thereof.

---

This invention relates to the pressing of articles of thermoplastic materials. More specifically the invention relates to apparatus for free pressing articles of molten thermoplastic materials such as glass-making compositions.

In the so-called free pressing of articles of a molten thermoplastic material such as, for example, glass tableware articles, the neck-ring mold otherwise employed is dispensed with, and gobs of molten glass are individually supplied to a press mold and pressed therein by a co-operating plunger, the volume of the gob supplied to the press mold being less than the volume of the cavity formed between the pressing surfaces of said mold and plunger when such plunger is disposed within such mold to its most extreme glass pressing position. The control of dimensions when employing such technique of free pressing depends on control of many variables, such as, the pressure applied while pressing, the time period of pressure application, the gob weight or volume; the gob temperature and composition, and the associated viscosity of the gob; the mold and plunger contour, and the temperature of such glass-forming members.

One method of free pressing glassware or articles in which dimensional control is not dependent on control of so many variables, is disclosed in Letters Patent of the United States 1,812,564 issued June 30, 1931, to Theodore H. Sloan for "Method of Pressing Glassware." In the method disclosed in such patent, a plurality of downwardly extending stops or legs are provided about the edge of a glass-forming plunger, the bottom of such legs coming to rest upon a ledge of the cooperating press mold, during a pressing operation, to limit the movement of the glass-contacting face of the plunger to within a definite distance from the glass-contacting face of the mold. A gob of glass previously supplied to the center of the mold is, therefore, pressed and spread outwardly until said legs or stops contact said ledge and prevent further pressing thereof. As in the previously mentioned free pressing techniques, the volume of the glass gob is less than the volume of the glass-forming cavity, the limits of which are defined by said legs or stops and, therefore, no neck-ring mold need be employed to confine the outwardly spread peripheral edge of the pressed article to a pre-selected limit.

While the free pressing of glass articles by the method disclosed in said Sloan patent is satisfactory for articles of ordinary quality and value, it has been found that such method is not suitable to the free pressing of high quality articles, such as articles of dinnerware formed from the relatively new glass-ceramic compositions. The objections to such method in the pressing of such high quality articles are, that, during cooling, contraction of the glass takes place and, since contact is not maintained between glass, mold and plunger because of such contraction, objectional ripples are caused in one or more surfaces of the formed glass article and the contour imparted thereto by the pressing operation is not maintained.

It is, accordingly, one object of the present invention to provide a novel apparatus for free pressing high quality articles of a thermoplastic material such as a glass-ceramic composition.

It is another object of the invention to provide a novel apparatus for free pressing glass articles, such apparatus accurately controlling the finished dimensions thereof.

It is a third object of the invention to provide a novel apparatus for free pressing, such apparatus providing dimensional control which is dependent on control of a minimum number of variables.

It is another object of the invention to provide an apparatus for free pressing of glass articles, such apparatus providing dimensional control which is substantially dependent on gob weight or volume only.

In accomplishing the above objects of the invention, there is provided, in conjunction with a press including cooperating male and female mating mold members, manually adjustable means for limiting the degree of mating relationship of said mold members during a pressing operation, and means for thereafter maintaining the forming surfaces of said members in contact with the formed surfaces of a pressed article to aid in cooling thereof and, during such cooling, maintaining the contour imparted thereto by said members during said pressing operation.

Other objects and characteristic features of the invention will become apparent as the description proceeds.

The invention will best be understood with reference to the single drawing figure which comprises an elevational view, substantially in cross-section, illustrating a preferred form of apparatus embodying the invention.

Referring to the single drawing figure, there is illustrated a glass press of a type in which a mold or mold member 11 mounted on a support or platform 12 is moved upwardly toward a vertically stationary cooperating and mating plunger or plunger member 13 to press a gob of thermoplastic material, such as a glass making material previously supplied to said mold, into a formed article such as the plate or dish 14 shown between said mold members. Plunger or plunger member 13 is affixed in depending fashion to the bottom of a support 16 which may be laterally movable, for purposes hereinafter discussed, to laterally move plunger 13 out of the vertical path of movement of mold 11. However, the details of support 16 and the means providing for lateral movement of such support and plunger 13 form no part of the present invention per se and are not essential thereto. Such apparatus is, therefore, not shown in the drawings for purposes of simplification thereof.

A somewhat spool shaped fluid pressure cylinder 21 having an enlarged bore or hollow portion 19 is supported by a carrier 15, in the usual well-known manner, and surrounds an associated piston 17 having an annular portion 18 slidable but snugly fitting within the enlarged bore portion of its associated cylinder. Piston 17 is also a somewhat spool shaped fluid pressure cylinder having an enlarged bore or hollow portion 22 which surrounds another piston 23 having an annular portion 24 slidably but snugly fitting within the enlarged bore portion of its associated cylinder, that is, of piston 17. It will be readily recognized that such piston and cylinder members, thus, are concentrically arranged, that is, have concentric axes.

The upper and lower ends of piston 17 extend through the bore of and beyond the ends of cylinder 21, while the upper and lower ends of piston 23 likewise extend through the bore of and beyond the ends of piston or cylinder 17. Platform 12, and mold 11 mounted thereon, are carried or supported on the upper ends of both pistons 17 and 23, such platform being affixed in any convenient manner to such end of piston 23. This arrangement will be readily apparent from a brief glance at the single drawing figure.

The bottom end of piston 17 is provided with external screw threads 26 and a manually adjustable nut 27, having cooperating internal screw threads 28, is screwed onto the bottom end of piston 17. The top annular brim of nut 27, as illustrated, comes to rest against the annular bottom surface of cylinder 21 during certain periods of operation of the apparatus. As is apparent, nut 27 limits the upward movement of piston 17 within cylinder 21 in accordance with the point of adjustment of the nut, that is, in accordance with the distance the nut is screwed onto the bottom end of piston 17. This will be further discussed hereinafter in this description.

A pair of fluid passages 31 and 32 extend through the wall of cylinder 21 and lead to the top and bottom, respectively, of the enlarged bore portion 19 of such cylinder. Similarly, a pair of fluid passages 33 and 34 extend through the wall of cylinder or piston 17 and lead to the top and bottom, respectively, of the enlarged bore portion 22 of such member. Flexible fluid conduits 36, 37, 38 and 39 connect to fluid passages 31, 32, 33 and 34, respectively, to selectively supply pressurized fluid to the enlarged bore portions 19 and 22 of members 21 and 17, respectively. High pressurized fluid is selectively supplied to cylinder 21 through conduits 36 and 37 for purposes hereinafter discussed in an operational example of the invention. Similarly, low pressurized fluid is selectively supplied to piston-cylinder member 17 through conduits 38 and 39 for purposes also hereinafter discussed. The means for selectively controlling the supply of pressurized fluids to said conduits and thereby to the cylinder members are well known in the art and, therefore, are not shown in the drawings since such means per se form no part of the present invention. Manually controlled fluid valves may, for example, be employed for controlling said supply of pressurized fluids.

A brief operational example of the apparatus embodying the invention will now be given.

It will be assumed that the annular portion 24 of plunger 23 rests near the bottom of the enlarged bore portion 22 of member 17, as illustrated in the drawing, and that the annular portion 18 of member 17 rests near the bottom of the enlarged bore portion 19 of cylinder 21. Nut 27 is manually adjusted on the bottom end of member 17 in accordance with the size of a measured gob of molten thermoplastic material, such as a glass-making material, to be supplied to mold 11 and in accordance with desired dimensions for an article, such as a dish or plate for example, to be pressed from such measured gob of material. The measured gob of material is supplied, in any of the convenient well-known manners, to the center of the cavity in mold 11 and high and low pressurized fluids are supplied to conduits 37 and 38, respectively, and thence through passages 32 and 33, respectively, to the enlarged bore portions 19 and 22, and thereby to the bottom surface of the annular portion 18 of member 17 and the top surface of the annular portion 24 of member or piston 23, respectively. The high pressurized fluid supplied through passage 32 actuates piston or member 17 in an upward direction until the nut 27 rests against the bottom annular surface of cylinder 21, as illustrated in the drawing. Thus, the measured gob of molten thermoplastic material previously supplied to mold 11 is formed into an article, such as the dish or plate 14, of the desired dimensions. The low pressurized fluid supplied through passage 33 at such time maintains piston 23 in its lowermost position and platform 12 down against the top surface of member 17.

Immediately following the pressing of the article as discussed above, that is, following the contacting of the annular bottom portion of cylinder 21 by nut 27, the low pressurized fluid supplied through passage 33 is released and similar pressurized fluid is supplied through conduit 39 and passage 34 to the bottom surface of the annular portion 24 of piston 23, the pressure of such fluid being selected so as to provide a force sufficient only to maintain the forming surfaces of mold 11 and plunger 13 against the formed surfaces of article 14 during a period of cooling and consequential contraction of such article. As is well known to those skilled in the art, the mold and plunger members will aid in the cooling of the article at such time and, in addition, the low pressure force existing between such members and against the formed surfaces of article 14 will prevent crinkling or rippling of such surfaces without further pressing of the article.

After sufficient heat has been removed from the formed article to assure sealing-in of the configuration imparted thereto by the mold and plunger members, pressurized fluids supplied to passages 32 and 34 may be released and such fluids may be supplied through conduits 36 and 38 and thence through passages 31 and 33, respectively, to return the respective plungers 17 and 23 to their above described original positions in preparation for take-out of the formed article. As previously mentioned, if the press with which the present invention is employed is of the type in which plunger 13 is laterally movable, such take-out may be alternatively performed by laterally moving the plunger out of the vertical path of movement of mold 11, and then again releasing the low pressurized fluid supplied through passage 33 and supplying similar pressurized fluid to passage 34 to move mold 11 upwardly to a ware or article take-out mechanism. Following the take-out of the formed and cooled article, the supply of pressurized fluid supplied through passage 34 is released and pressurized fluid is again supplied through passage 33 to actuate plunger 23 to its lowermost position in preparation for another pressing operation. However, prior to such actuation, if the apparatus embodying the present invention includes a gobbing system suitable for such type of operation, another molten gob of thermoplastic material may be supplied to mold 11 while it is in its upward position.

It is believed expedient to point out that the bottom end of piston 23 is shown extending through the bottom end of the bore of member 17 so that, if found desirable or expedient, such member can be provided with a cavity or hollow extending longitudinally therethrough, platform or support 12 can be provided with an orifice in the center thereof and, thereby, air or other cooling mediums can be supplied through the bottom end of member 17 to the bottom of mold 11 for cooling thereof. It will also be noted that piston 23 is illustrated as vertically movable through a distance much greater than necessary for maintaining the forming surfaces of mold 11 and plunger 13 against the formed surfaces of the pressed article such as dish or plate 14 during cooling thereof. Such arrangement for the movement of piston 23 per se forms no part of the present invention but, as previously mentioned, provides for the raising of mold 11 through a vertical path to a gob feeding apparatus and a take-out mechanism when plunger 13 and support 16 are laterally moved out of such vertical path of movement. This will be readily apparent to those skilled in the art and, since such arrangement forms no part of the present invention, illustration of the gob feeding apparatus or take-out mechanism and further discussion thereof are unnecessary for the completion of the present invention disclosure.

It is pointed out that the invention disclosed herein may be practiced in conjunction with a glass pressing apparatus wherein the plunger is moved toward a stationary mold as well as with the type illustrated in the drawing and, although the invention disclosed herein is described in conjunction with a specific type of glass pressing apparatus, such description is not intended to be in any way limiting but it is to be understood that the desired exclusive rights sought are to be limited only by the spirit and scope of the appended claims.

I claim:

1. Apparatus for free pressing articles of a thermoplastic material in a press including a mold member and a cooperating overlying mating plunger member, such apparatus comprising; a pair of fluid actuated pistons and associated cylinders supporting one of said members for movement thereof into and out of mating relationship with the other, one piston of such pair carrying the other thereof; manually adjustable means on said one of said pistons for limiting the movement thereof in one direction and thereby the degree of mating relationship of said members caused by such movement, and means for selectively supplying pressurized fluid to said cylinders for actuation of said pistons.

2. Apparatus for free pressing articles of a thermoplastic material in a press including a mold member and a cooperating overlying mating plunger member, such apparatus comprising; a pair of pressurized-fluid cylinders and associated pistons supporting one of said members for movement thereof into and out of mating relationship with the other, one of said pistons carrying the cylinder associated with the other of the pistons; manually adjustable means on said one piston for limiting the movement thereof in the direction of said mating relationship; and conduit means for selectively supplying high and low pressurized fluid to the cylinders associated with said one and the other of the pistons, respectively, whereby a measured gob of thermoplastic material supplied to said mold member is pressed to a predetermined size limited by said manually adjustable means and whereby said press members are maintained against the surfaces of the pressed gob without further pressing during cooling thereof.

3. Apparatus for free pressing articles of a thermoplastic material in a press including a mold member and cooperating overlying mating plunger member, such apparatus comprising; a first pressurized-fluid cylinder having a first piston embodying a second pressurized-fluid cylinder and an associated second piston, said pistons supporting one of said members for movement thereof in first and second directions into and out of mating relationship with the other; means on said first piston for selectively adjusting the limit of movement thereof in said first direction; and conduit means for successively supplying fluid to said first and second cylinders at selected high and low pressures, respectively, whereby a measured gob of said material supplied to said mold member is pressed to form an article of a size limited by said selectively adjusting means and, thereafter, said mold and plunger members are maintained against the formed surfaces of said article to aid in cooling thereof and maintain the pressed-in form imparted thereto.

4. Apparatus in accordance with claim 3 in which said cylinders and the respectively associated pistons are concentrically arranged.

5. Apparatus in accordance with claim 4 in which said thermoplastic material is a glass-making material.

6. In combination with a press including mating mold members for free pressing articles of a thermoplastic material, means comprising a first fluid pressure cylinder and associated piston for actuating said press to press form said articles from measured gobs of thermoplastic material supplied between said mold members, manually adjustable means for selectively limiting the degree of mating of said mold members in each press forming operation; means comprising a second fluid pressure cylinder and associated piston for maintaining the forming surfaces of said mold members in contact with the formed surfaces of each said article without further pressing following the forming thereof, whereby the cooling of said articles is aided and, during such cooling, warping or crinkling of the formed surfaces of the articles is prevented; and fluid pressure conduit means for successively supplying high and low fluid pressures to said first and second cylinders, respectively, for actuation of the pistons thereof to perform said press forming and cooling operations.

7. Apparatus in accordance with claim 6 in which one of said pistons embodies the cylinder associated with the other piston.

8. Apparatus in accordance with claim 7 in which the axes of said cylinders and pistons are concentric.

9. Appaartus in accordance with claim 6 in which said thermoplastic material comprises a glass-making composition.

References Cited

UNITED STATES PATENTS

| | | | |
|---|---|---|---|
| 3,353,942 | 11/1967 | Ambrogi et al. | 65—68 |
| 2,584,815 | 2/1952 | Salfisberg | 156—583 |
| 3,214,258 | 10/1965 | Martin | 65—320 |

DONALL H. SYLVESTER, *Primary Examiner.*

E. R. FREEDMAN, *Assistant Examiner.*

U.S. Cl. X.R.

65—66, 68, 83, 318; 264—319; 18—16.5